US012517540B2

(12) United States Patent
Sone

(10) Patent No.: US 12,517,540 B2
(45) Date of Patent: Jan. 6, 2026

(54) TEMPERATURE COMPENSATION FOR INTEGRATED CIRCUITS

(71) Applicant: Synaptics Incorporated, San Jose, CA (US)

(72) Inventor: Yasuhiko Sone, Gunma (JP)

(73) Assignee: Synaptics Incorporated, San Jose, CA (US)

( * ) Notice: Subject to any disclaimer, the term of this patent is extended or adjusted under 35 U.S.C. 154(b) by 36 days.

(21) Appl. No.: 18/492,852

(22) Filed: Oct. 24, 2023

(65) Prior Publication Data

US 2025/0130607 A1 Apr. 24, 2025

(51) Int. Cl.
*G05F 3/26* (2006.01)
*G05F 3/30* (2006.01)

(52) U.S. Cl.
CPC ................ *G05F 3/262* (2013.01); *G05F 3/30* (2013.01)

(58) Field of Classification Search
None
See application file for complete search history.

(56) References Cited

U.S. PATENT DOCUMENTS 6,087,820 A * 7/2000 Houghton ............... G05F 3/262 323/907
7,164,325 B2 * 1/2007 Aparin ...................... H03L 1/00 331/176
7,233,195 B2 * 6/2007 Oh ............................ G05F 3/30 327/540
7,777,558 B2 * 8/2010 Chen ......................... G05F 3/30 327/539
7,880,534 B2 * 2/2011 Huang et al. ............. G05F 3/30 327/512
8,207,787 B2 * 6/2012 Hasegawa ................. G05F 3/30 327/539
8,797,094 B1 8/2014 Washburn et al.
(Continued)

FOREIGN PATENT DOCUMENTS

KR 101241378 B1 3/2013

OTHER PUBLICATIONS

International Search Report, dated Feb. 5, 2025, in International Patent Application No. PCT/US2024/051923 filed Oct. 18, 2024.

*Primary Examiner* — Thomas J. Hiltunen
(74) *Attorney, Agent, or Firm* — Leydig, Voit & Mayer, Ltd.

(57) ABSTRACT

An integrated circuit includes a current mirror configured to provide a first current to a first node, provide a second current to a second node virtually shorted to the first node, and provide a third current to a voltage output node. The integrated circuit further includes a first pn junction element between the first node and a ground line, a first resistor element between the second node and the ground line, a second pn junction element coupled in series to the first resistor element, a first load component configured to generate an output voltage at the voltage output node, and a subsequent stage circuit configured to generate an output signal based on the output voltage. The first load component is configured to cause the output voltage to have a non-zero temperature dependence that at least partially cancels a temperature dependence of the output signal of the subsequent stage circuit.

18 Claims, 8 Drawing Sheets

(56) References Cited

U.S. PATENT DOCUMENTS

| | | | | |
|---|---|---|---|---|
| 8,836,315 | B2 * | 9/2014 | Satoh | G05F 3/30<br>323/316 |
| 9,411,354 | B2 * | 8/2016 | Hu | G05F 3/30 |
| 10,379,567 | B2 | 8/2019 | Sone | |
| 10,878,902 | B2 * | 12/2020 | Lai | G11C 13/004 |
| 11,092,991 | B2 | 8/2021 | Sone | |
| 11,429,131 | B2 * | 8/2022 | Nakatani | G05F 3/30 |
| 11,789,482 | B2 * | 10/2023 | Lee | H03K 3/011<br>331/45 |
| 2015/0084613 | A1 | 3/2015 | Ho et al. | |
| 2017/0023967 | A1 * | 1/2017 | Lee | G05F 3/262 |
| 2020/0125129 | A1 | 4/2020 | Ibrahim et al. | |
| 2023/0084920 | A1 | 3/2023 | Nakatani et al. | |

* cited by examiner

TEMPERATURE COMPENSATION FOR INTEGRATED CIRCUITS

TECHNICAL FIELD

This disclosure relates generally to integrated circuits and more particularly to temperature compensation for integrated circuits.

BACKGROUND

Integrated circuits are often desired to generate a temperature-stabilized output signal. For example, a constant current source may be desired to generate a current that is constant with temperature, and an oscillator circuit may be desired to generate an oscillating output of a frequency that is constant with temperature.

One method for generating a temperature-stabilized output signal is to use a bandgap voltage reference (BGR) circuit. To improve the temperature stability, an integrated circuit may incorporate a BGR circuit and generate an output signal using a temperature independent voltage generated by the BGR circuit. For example, a constant current source may be configured to generate a constant current by performing a voltage-to-current conversion on a temperature independent reference voltage generated by a BGR circuit.

SUMMARY

This summary is provided to introduce a selection of concepts, in a simplified form, that are further described below. This summary is not necessarily intended to identify key features or essential features of the present disclosure. The present disclosure may include the following various aspects and embodiments.

In an exemplary embodiment, the present disclosure provides an integrated circuit. The integrated circuit includes a first current mirror, a first pn junction element, a first resistor element, a second pn junction element, a first load component, and a subsequent stage circuit. The first current mirror is configured to provide a first current to a first node, provide a second current to a second node virtually shorted to the first node, and provide a third current to a first voltage output node. The first pn junction element is coupled between the first node and a ground line. The first resistor element is coupled between the second node and the ground line. The second pn junction element is coupled in series to the first resistor element. The first load component is coupled between the first voltage output node and the ground line and configured to generate a first output voltage at first voltage output node. The subsequent stage circuit is configured to generate an output signal based on the first output voltage. The first load component is configured to cause the first output voltage to have a non-zero temperature dependence that at least partially cancels a temperature dependence of the output signal of the subsequent stage circuit.

In another exemplary embodiment, the present disclosure provides a method. The method includes providing, by a first current mirror, a first current to a first node coupled to a ground line via a first pn junction element. The method further includes providing, by the first current mirror, a second current to a second node virtually shorted to the first node. The second node is coupled to the ground line via a second pn junction element and a first resistor element coupled in series. The method further includes providing, by the first current mirror, a third current to a first voltage output node. The method further includes generating, by a first load component coupled between the first voltage output node and the ground line, a first output voltage at the first voltage output node. The method further includes generating, by a subsequent stage circuit, an output signal based on the first output voltage. The first output voltage has a non-zero temperature dependence that at least partially cancels a temperature dependence of the output signal of the subsequent stage circuit.

Other features and aspects are further described below with reference to the attached drawings.

Figure 1:
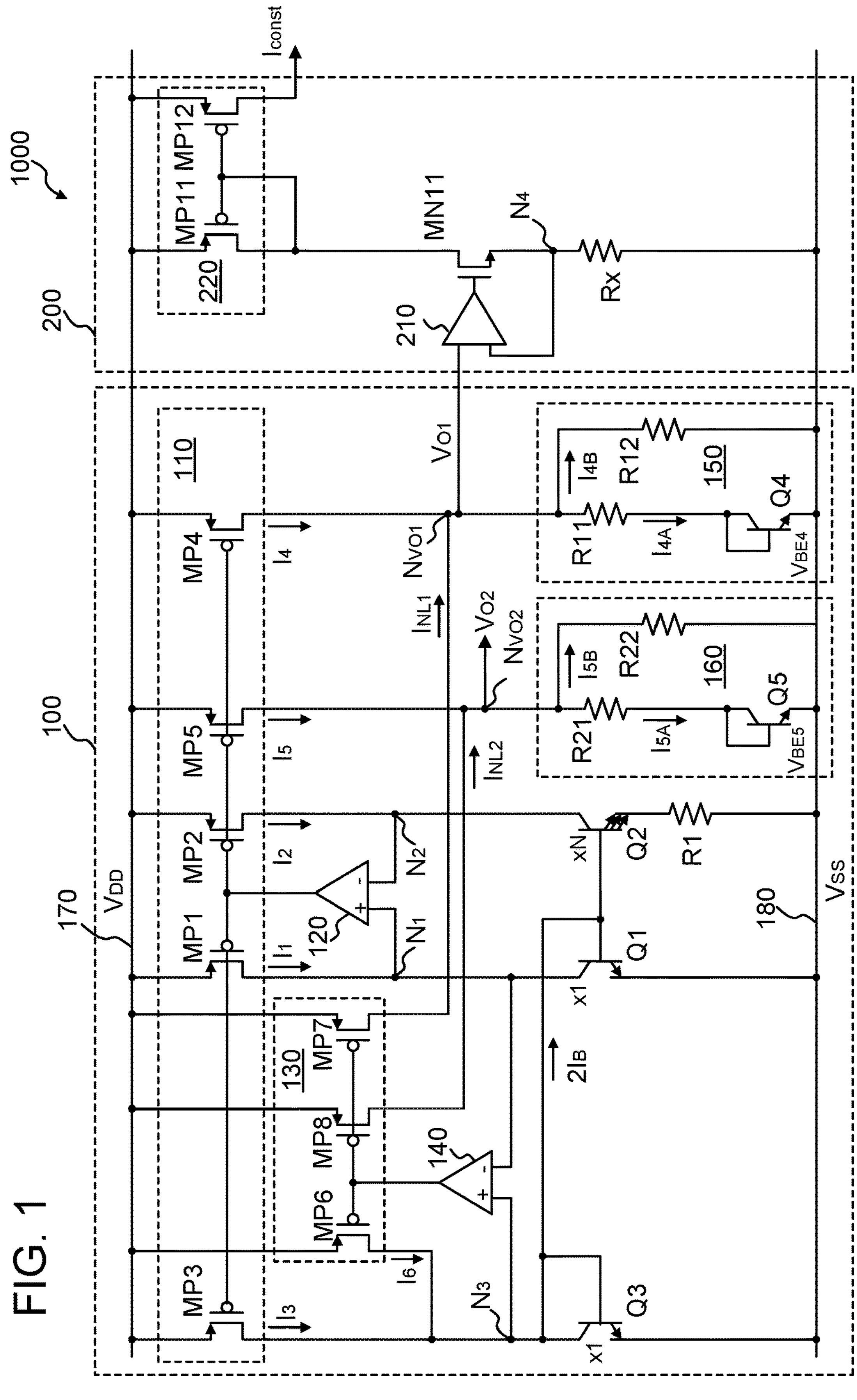
FIG. 1 shows an example configuration of an integrated circuit, according to one or more embodiments.

To facilitate understanding, identical reference numerals have been used, where possible, to designate elements that are common to the figures. It is contemplated that elements disclosed in one embodiment may be utilized in other embodiments without specific recitation. Suffixes may be attached to reference numerals to distinguish elements from each other. The drawings referenced to herein are not to be construed as being drawn to scale unless specifically noted. In addition, the drawings are often simplified and details or components are omitted for clarity of presentation and explanation. The drawings and discussion serve to explain principles discussed below.

DETAILED DESCRIPTION

The following detailed description is exemplary in nature and is not intended to limit the disclosure or the applications and uses of the disclosure. Furthermore, there is no intention to be bound by any expressed or implied theory presented in the preceding background, summary and brief description of the drawings, or in the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

The term "coupled" as used herein means connected directly to or connected through one or more intervening components or circuits. Further, throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

One method of generating a temperature-stabilized output signal is to use a bandgap voltage reference (BGR) circuit, which can generate a temperature independent reference voltage based on the temperature characteristics of pn junction elements, such as diodes and bipolar transistors. An integrated circuit may be configured to generate a temperature independent reference voltage by a BGR circuit and to generate a temperature-stabilized output signal from the temperature independent reference voltage by a subsequent stage circuit.

This method may not however sufficiently suppress the temperature dependence of the output signal if the subsequent stage circuit exhibits a significant temperature dependence. For example, in implementations where the subsequent stage circuit is configured as a voltage-to-current conversion circuit that uses a voltage-to-current conversion resistor, the resulting current may exhibit a significant temperature dependence due to the temperature characteristics of the voltage-to-current conversion resistor. Accordingly, there is a technological need to provide a novel technology for generating a temperature-independent signal.

The present disclosure recognizes that the temperature dependence of the output voltage of a BGR circuit is flexibly adjustable with circuit element parameters, such as resistor resistances and transistor sizes. The present disclosure takes advantage of the flexibility in adjusting the temperature dependence of the output voltage of a BGR circuit to enable an integrated circuit to generate a temperature-stabilized output signal. In one or more embodiments, an integrated circuit includes a BGR-based voltage generator circuit and a subsequent stage circuit. The BGR-based voltage generator circuit is configured to generate an output voltage having a non-zero temperature dependence, and the subsequent stage circuit (e.g., a voltage-to-current conversion circuit) is configured to generate a desired output signal (e.g., a temperature-independent constant current, an oscillating output of a temperature-independent frequency etc.) using the output voltage of the BGR-based voltage generator circuit. The non-zero temperature dependence of the output voltage of the BGR-based voltage generator circuit is adjusted to at least partially cancel the temperature characteristics of the subsequent stage circuit. This effectively achieves improved temperature compensation, allowing the subsequent stage circuit to generate an output signal that is stable with temperature. Described below are various embodiments of the present disclosure which achieve improved temperature compensation based on a BGR-based voltage generator circuit.

FIG. 1 shows an example configuration of an integrated circuit 1000, according to one or more embodiments. In the shown embodiment, the integrated circuit 1000 includes a voltage generator circuit 100 and a voltage-to-current conversion circuit 200. The voltage generator circuit 100 is configured to generate and provide a first output voltage $V_{O1}$ and a second output voltage $V_{O2}$ based on a BGR-based circuit configuration. The voltage-to-current conversion circuit 200 is a subsequent stage circuit configured to perform a voltage-to-current conversion on the first output voltage $V_{O1}$ to generate a constant output current Iconst. As discussed in detail later, the first output voltage $V_{O1}$ is generated to have a non-zero temperature dependence that at least partially cancels the temperature dependence of the constant output current Iconst, while the second output voltage $V_{O2}$ is generated to be substantially constant with temperature. The voltage generator circuit 100 includes a first current mirror 110, a first operational amplifier 120, a second current mirror 130, a second operational amplifier 140, a first load component 150, a second load component 160, a resistor element R1, and bipolar transistors Q1, Q2, and Q3.

The first current mirror 110 is coupled to a power supply line 170 that provides a high-side power supply voltage $V_{DD}$ and is configured to generate first, second, third, fourth, and fifth currents $I_1$, $I_2$, $I_3$, $I_4$, and $I_5$ such that the currents $I_1$, $I_2$, $I_3$, $I_4$, and $I_5$ have the same current level. In the shown embodiment, the first current mirror 110 includes p-channel metal oxide semiconductor (PMOS) transistors MP1, MP2, MP3, MP4, and MP5 that have commonly-coupled gates. The sources of the PMOS transistors MP1 to MP5 are commonly coupled to the power supply line 170. The PMOS transistors MP1, MP2, and MP3 have drains coupled to nodes $N_1$, $N_2$, and $N_3$, respectively, and are configured to provide the first, second, and third currents $I_1$, $I_2$, and $I_3$, respectively, to the nodes $N_1$, $N_2$, and $N_3$. The PMOS transistors MP4 and MP5 have drains coupled to the first and second voltage output nodes $N_{VO1}$ and $N_{VO2}$, respectively, and are configured to provide the fourth and fifth currents $I_4$ and $I_5$ to the first and second voltage output nodes $N_{VO1}$ and $N_{VO2}$, respectively.

The first operational amplifier 120 is configured to output a control voltage to the commonly-coupled gates of the PMOS transistors MP1 to MP5 to control the first to fifth currents $I_1$ to $I_5$. The first operational amplifier 120 has a non-inverting input coupled to the node $N_1$, an inverting input coupled to the node $N_2$, and an output coupled to the commonly-coupled gates of the PMOS transistors MP1 to MP5. The first operational amplifier 120 is configured to control the gate voltage of the PMOS transistors MP1 to MP5 such that the nodes $N_1$ and $N_2$ have the same voltage level. In other words, the nodes $N_1$ and $N_2$ are virtually shorted by the operation of the first operational amplifier 120.

The bipolar transistors Q1, Q2, and Q3 operate as first, second, and third pn junction elements, respectively, each of which incorporates a pn junction. As discussed in detail later, the current-voltage characteristics of the pn junctions within the bipolar transistors Q1, Q2, and Q3 cause the first to fifth currents $I_1$ to $I_5$ to be generated as proportional to absolute temperature (PTAT) currents. In the shown embodiment, NPN transistors are used as the bipolar transistors Q1, Q2, and Q3. The bases of the bipolar transistors Q1, Q2, and Q3 are commonly coupled to the collector of the bipolar transistor Q3. The collectors of the bipolar transistors Q1, Q2, and Q3 are coupled to the nodes N1, N2, and N3, respectively. The emitters of the bipolar transistors Q1 and Q3 are coupled to a ground line 180 that provides a low-side power supply voltage $V_{SS}$, and the emitter of the bipolar transistor Q2 is coupled to the ground line 180 via the resistor element R1. The first, second, and third currents $I_1$, $I_2$, and $I_3$ received from the first current mirror 110 flow in the forward directions through the base-emitter pn junctions of the bipolar transistors Q1, Q2 and Q3, respectively. In one implementation, the area of the base-emitter junction of the bipolar transistor element Q3 is the same as that of the base-emitter junction of the bipolar transistor element Q1, while the area of the base-emitter junction of the bipolar transistor element Q2 is N times as large as that of the base-emitter junction of the bipolar transistor element Q1, where N is a number greater than one.

The second current mirror 130 is configured to provide a sixth current $I_6$ to the node $N_3$, a first neutralization current $I_{NL1}$ to the first voltage output node $N_{VO1}$, and a second neutralization current $I_{NL2}$ to the second voltage output node $N_{VO2}$. In the shown embodiment, the second current mirror 130 includes PMOS transistors MP6, MP7, and MP8 that have commonly-coupled gates. The sources of the PMOS transistors MP6, MP7, and MP8 are commonly coupled to the power supply line 170. The drain of the PMOS transistor MP6 is coupled to the node $N_3$, and the drains of the PMOS transistors MP7 and MP8 are coupled to the first and second voltage output nodes $N_{VO1}$ and $N_{VO2}$, respectively. The PMOS transistor MP6 is configured to output the current $I_6$ from the drains thereof to provide the current $I_6$ to the node $N_3$. The PMOS transistors MP7 and MP8 are configured to output the first and second neutralization currents $I_{NL1}$ and $I_{NL2}$, respectively, from the drains thereof and to provide the first and second neutralization currents $I_{NL1}$ and $I_{NL2}$ to the first and second voltage output nodes $N_{VO1}$ and $N_{VO2}$, respectively.

The current levels of the first and second neutralization currents $I_{NL1}$ and $I_{NL2}$ are proportional to the current level of the current $I_6$. In one implementation, the current level of the first neutralization current $I_{NL1}$ is $A_1$ times the current level of the current $I_6$, and the current level of the second neutralization current $I_{NL2}$ is $A_2$ times the current level of the current $I_6$, where $A_1$ and $A_2$ may be less than one. The current $I_6$ is used to provide base currents to the bipolar transistors Q1, Q2, and Q3. In one implementation, the current $I_6$ is the sum current of the base currents to the bipolar transistors Q1, Q2, and Q3.

The second operational amplifier 140 is configured to output a control voltage to the commonly-coupled gates of the PMOS transistors MP6, MP7, and MP8 to control the current $I_6$ and the first and second neutralization currents $I_{NL1}$ and $I_{NL2}$. The second operational amplifier 140 has a non-inverting input coupled to the node $N_3$, an inverting input coupled to the node $N_1$, and an output coupled to the commonly-coupled gates of the PMOS transistors MP6 to MP8. The second operational amplifier 140 is configured to control the gate voltage of the PMOS transistors MP6 to MP8 such that the nodes $N_1$ and $N_3$ have the same voltage level. In other words, the nodes $N_1$ and $N_3$ are virtually shorted by the operation of the second operational amplifier 140.

The first load component 150 is coupled between the first voltage output node $N_{VO1}$ and the ground line 180. The first load component 150 is configured to generate the first output voltage $V_{O1}$ from the fourth current $I_4$ received from the first current mirror 110. In the shown embodiment, the first load component 150 includes a diode-connected bipolar transistor Q4 and resistor elements R11 and R12. The diode-connected bipolar transistor Q4 operates as a pn junction element. In one implementation, the base-emitter junction of the bipolar transistor Q4 may have the same area as the base-emitter junctions of the bipolar transistors Q1 and Q3. The bipolar transistor Q4 and the resistor element R11 are coupled in series between the first voltage output node $N_{VO1}$ and the ground line 180. It is noted that the positions of the bipolar transistor Q4 and the resistor element R11 are interchangeable. Further, the resistor element R12 is coupled between the first voltage output node $N_{VO1}$ and the ground line 180 in parallel to the bipolar transistor Q4 and the resistor element R11.

The second load component 160 is coupled between the second voltage output node $N_{VO2}$ and the ground line 180. The second load component 160 is configured to generate the second output voltage $V_{O2}$ from the fifth current $I_5$ received from the first current mirror 110. In the shown embodiment, the second load component 160 includes a diode-connected bipolar transistor Q5 and resistor elements R21 and R22. The diode-connected bipolar transistor Q5 operates as a pn junction element. In one implementation, the base-emitter junction of the bipolar transistor Q5 may have the same area as the base-emitter junctions of the bipolar transistors Q1 and Q3. The bipolar transistor Q5 and the resistor element R21 are coupled in series between the second voltage output node $N_{VO2}$ and the ground line 180. It is noted that the positions of the bipolar transistor Q5 and the resistor element R21 are interchangeable. Further, the resistor element R22 is coupled between the second voltage output node $N_{VO2}$ and the ground line 180 in parallel to the bipolar transistor Q5 and the resistor element R21.

The voltage-to-current conversion circuit 200 is configured to perform voltage-to-current conversion on the first output voltage $V_{O1}$ to generate the constant output current Iconst. In the shown embodiment, the voltage-to-current conversion circuit 200 includes an operational amplifier 210, a voltage-to-current conversion resistor Rx, an n-channel metal oxide semiconductor (NMOS) transistor MN11, and a current mirror 220. The operational amplifier 210 has a first input receiving the first output voltage $V_{O1}$ and a second input coupled to a node $N_4$. The voltage-to-current conversion resistor Rx is coupled between the node $N_4$ and the ground line 180. The NMOS transistor MN11 has a gate coupled to the output of the operational amplifier 210, a source coupled to the node $N_4$, and a drain coupled to the current mirror 220. The current mirror 220 includes a pair of PMOS transistors MP11 and MP12. The sources of the PMOS transistors MP11 and MP12 are commonly coupled to the power supply line 170 and the gates of the PMOS transistors MP11 and MP12 are commonly coupled to the drain of the PMOS transistor MP11. The current mirror 220 is configured to mirror the current flowing through the voltage-to-current conversion resistor Rx and the NMOS transistor MN11 to generate the constant output current Iconst.

Although the first load component 150 and the second load component 160 have similar circuit topologies, circuit element parameters of the first load component 150 and the second load component 160 are determined to cause different behaviors between the first output voltage $V_{O1}$ and the second output voltage $V_{O2}$. One or more circuit element parameters of the first load component 150 (e.g., the resistances of the resistor elements R11 and R12 and the area of the base-emitter junction of the bipolar transistor Q4) are adjusted such that the first output voltage $V_{O1}$ has a non-zero temperature dependence that at least partially cancels the temperature characteristics of the voltage-to-current conversion circuit 200. In some implementations, one or more circuit element parameters of the first load component 150 are adjusted such that the first output voltage $V_{O1}$ has a non-zero temperature dependence that causes the constant output current Iconst to be substantially constant with temperature. In implementations where the resistance of the voltage-to-current conversion resistor Rx of the voltage-to-current conversion circuit 200 has a significant temperature dependence, the first output voltage $V_{O1}$ may be generated to have a non-zero temperature dependence that at least partially cancels temperature-dependent variations in the output current potentially caused by the temperature-dependent resistance of the voltage-to-current conversion resistor Rx. For example, in implementations where the resistance of the voltage-to-current conversion resistor Rx increases with temperature, one or more circuit element parameters of the first load component 150 are adjusted to increase the first output voltage $V_{O1}$ in accordance with the temperature-dependent increase in the resistance of the voltage-to-current conversion resistor Rx. In contrast, the circuit element parameters of the second load component 160 (e.g., the resistances of the resistor elements R21 and R22 and the area of the base-emitter junction of the bipolar transistor Q5) are adjusted such that the second output voltage $V_{O2}$ is substantially constant with temperature. The second output voltage $V_{O2}$ can be used as a temperature independent reference voltage, similarly to the output voltage of a typical BGR circuit. The following is a detailed description of the operation of the integrated circuit 1000.

In one or more embodiments, the first to fifth currents $I_1$ to $I_5$, which are controlled to have the same current level, are each generated as a proportional to absolute temperature (PTAT) current as discussed below. For the base-emitter voltage $V_{BE1}$ of the bipolar transistor Q1 and the base-emitter voltage $V_{BE2}$ of the bipolar transistor Q2, based on the fact that the area of the base-emitter junction of the bipolar transistor Q2 is N times as large as that of the base-emitter junction of the bipolar transistor Q1, the following expressions (1a) and (1b) hold:

$$V_{BE1} = \frac{kT}{q}\ln\left(\frac{I}{I_S}\right), \text{ and} \tag{1a}$$

$$V_{BE2} = \frac{kT}{q}\ln\left(\frac{I}{I_S}\cdot\frac{1}{N}\right), \tag{1b}$$

where I is the current level of the first to fifth currents $I_1$ to $I_5$, $I_S$ is the backward saturation current, k is the Boltzmann constant, T is the absolute temperature, and q is the elementary charge.

Since the first and second nodes $N_1$ and $N_2$ are virtually-shorted and the voltage at the node $N_1$ is equal to the base-emitter voltage $V_{BE1}$ of the bipolar transistor Q1, the following expression (2) holds:

$$I = \frac{V_{BE1} - V_{BE2}}{R1}. \tag{2}$$

The current level I of the first to fifth currents $I_1$ to $I_5$ is represented by the following expression (3), which is obtained by substituting expressions (1a) and (1b) into expression (2):

$$I = \frac{Vt\cdot\ln(N)}{R1}, \tag{3}$$

where Vt is the thermal voltage given by the following expression (4):

$$Vt = \frac{kT}{q}. \tag{4}$$

Expressions (3) and (4) indicate that the current level I of the first to fifth currents $I_1$ to $I_5$ is proportional to the absolute temperature T, i.e., the first to fifth currents $I_1$ to $I_5$ are each a proportional to absolute temperature (PTAT) current.

The first and second neutralization currents $I_{NL1}$ and $I_{NL2}$, which are provided to the first voltage output node $N_{VO1}$ and $N_{VO2}$, respectively, are proportional to the sum of the base currents of the bipolar transistors Q1, Q2, and Q3, but are much smaller than the current level I of the first to fifth currents $I_1$ to $I_5$, as discussed below. Due to the operation of the second current mirror 130, the current levels of the first and second neutralization currents $I_{NL1}$ and $I_{NL2}$ are each proportional to the sixth current $I_6$, which is the sum current of the base currents of the bipolar transistors Q1, Q2, and Q3. Since the base current of an emitter-grounded bipolar transistor is much smaller than the collector current, the sixth current $I_6$ can be considered to be much smaller than the first, second, and third currents $I_1$, $I_2$, and $I_3$, which are the collector currents of the bipolar transistors Q1, Q2 and Q3. Accordingly, the current levels of the first and second neutralization currents $I_{NL1}$ and $I_{NL2}$ are also much smaller than the current level I of the first to fifth currents $I_1$ to $I_5$.

As a first approximation, the effects of the first and second neutralization currents $I_{NL1}$ and $I_{NL2}$ can be ignored (the effects of the first and second neutralization currents $I_{NL1}$ and $I_{NL2}$ are discussed later). In this first approximation, the following expression (5) holds with respect to the first voltage output node $N_{VO1}$:

$$I = I_{4A} + I_{4B}, \tag{5}$$

where $I_{4A}$ is the current through the resistor element R11 and the bipolar transistor Q4, and $I_{4B}$ is the current through the resistor element R12. With respect to the base-emitter voltage $V_{BE4}$ of the bipolar transistor Q4 and the voltage drops across the resistor elements R11 and R12, the following expression (6) holds:

$$V_{BE4} + I_{4A}\cdot R11 = I_{4B}\cdot R12. \tag{6}$$

From expressions (3) to (6), the current $I_{4B}$ is represented by the following expression (7):

$$\begin{aligned} I_{4B} &= \frac{I\cdot R11 + V_{BE4}}{R11 + R12} \\ &= \frac{1}{R11 + R12}\left(\frac{R11\cdot Vt\cdot\ln(N)}{R1} + V_{BE4}\right). \end{aligned} \tag{7}$$

Accordingly, the first output voltage $V_{O1}$ is represented by the following expression (8):

$$\begin{aligned} V_{O1} &= I_{4B}\cdot R12 \\ &= \frac{R12}{R11 + R12}\left(\frac{R11\cdot Vt\cdot\ln(N)}{R1} + V_{BE4}\right). \end{aligned} \tag{8}$$

Since the thermal voltage Vt (given by expression (4)) is proportional to the absolute temperature, expression (8) implies that the first order term of the temperature dependence of the first output voltage $V_{O1}$ can be controlled by the resistances of the resistor elements R11 and R1 of the first load component 150. Accordingly, it is possible to cancel the first order term of the temperature dependence of the constant output current Iconst by appropriately adjusting at least one of the resistances of the resistor elements R11 and R1.

Meanwhile, the second output voltage $V_{O2}$ is represented by the following expression (9), which is obtained similarly to expression (8):

$$V_{O2} = \frac{R22}{R21 + R22}\left(\frac{R21 \cdot Vt \cdot \ln(N)}{R1} + N_{BE5}\right), \tag{9}$$

where $V_{BE5}$ is the base-emitter voltage of the bipolar transistor Q5. Expression (9) implies that it is possible to generate the second output voltage $V_{O2}$ to be substantially constant with temperature by appropriately adjusting at least one of the resistances of the resistor elements R21 and R22 of the second load component 160.

The first neutralization current $I_{NL1}$, which is provided to the first voltage output node $N_{VO1}$, is used to cancel the second order term of the temperature dependence of the constant output current Iconst as discussed below. As discussed above, the first neutralization current $I_{NL1}$ is proportional to the sum current of the base currents of the bipolar transistors Q1, Q2, and Q3. Here, the base current $I_B$ of a bipolar transistor can be represented by the following expression (10):

$$I_C = I_B \cdot \beta_F(T), \tag{10}$$

where $\beta_F$ is the current amplification ratio and IC is the collector current. As known in the art, the temperature dependence of the current amplification ratio $\beta_F$ of a bipolar transistor is represented by the following expression (11):

$$\beta_F(T) \propto \exp\left(-\frac{\Delta Eg(N_E)}{kT}\right), \tag{11}$$

where $\Delta Eg(N_E)$ is a constant representing the bandgap narrowing effect in the emitter, which depends on the impurity concentration $N_E$ of the emitter. It is noted that $\Delta Eg(N_E)$ does not depends on the absolute temperature T.

By rewriting expression (11) with a temperature-independent positive constant $\alpha$ defined as $\alpha = \Delta Eg(N_E)/k$, the temperature dependence of the base current $I_B$ for a constant corrector current $I_C$ can be represented by the following expression (12):

$$I_B = \frac{I_C}{\beta_F(T)} \propto \exp\left(\frac{\alpha}{T}\right). \tag{12}$$

By expanding the right side of expression (12) into a Tayler series at a base point $T=T_0$, expression (13) is obtained:

$$\exp\left(\frac{\alpha}{T}\right) \approx \exp\left(\frac{\alpha}{T_0}\right) - \frac{\alpha}{T_0^2}\exp\left(\frac{\alpha}{T_0}\right)(T - T_0) + \frac{\alpha(2T_0 + \alpha)}{T_0^4}\exp\left(\frac{\alpha}{T_0}\right)\frac{(T - T_0)^2}{2}, \tag{13}$$

where it holds:

$$\frac{\alpha(2T_0 + \alpha)}{T_0^4}\exp\left(\frac{\alpha}{T_0}\right) > 0. \tag{14}$$

From expressions (13) and (14), it is understood that the base current $I_B$ of a bipolar transistor for a constant current $I_C$ incorporates a second order term of the temperature dependence.

Since the first neutralization current $I_{NL1}$ is proportional to the sum current of the base currents of the bipolar transistors Q1, Q2, and Q3, the first neutralization current $I_{NL1}$ also incorporates a second order term of the temperature dependence. Accordingly, by providing the first neutralization current $I_{NL1}$ to the first voltage node $N_{VO1}$, it is possible to cause the first output voltage $V_{O1}$ to exhibit a second order term of the temperature dependence. The current level of the first neutralization current $I_{NL1}$ is adjusted based on the temperature dependence of the constant output current Iconst. By appropriately adjusting the current level of the first neutralization current $I_{NL1}$, it is possible to cancel the second order term of the temperature dependence of the constant output current Iconst. In one implementation, the current level of the first neutralization current $I_{NL1}$ may be adjusted with the mirror ratio of the second current mirror 130 with respect to the first neutralization current $I_{NL1}$, that is, the ratio $A_1$ of the current level of the first neutralization current $I_{NL1}$ to the current level of the current $I_6$.

The second neutralization current $I_{NL2}$, which is provided to the second voltage output node $N_{VO2}$, is used to cancel the second order term of the temperature dependence of the second output voltage $V_{O2}$. Since the above discussion also applies to the second neutralization current $I_{NL2}$, the second neutralization current $I_{NL2}$ also incorporates a second order term of the temperature dependence. In one implementation, the current level of the second neutralization current $I_{NL2}$ is adjusted to cancel the second order term of the temperature dependence of the second output voltage $V_{O2}$. In one implementation, the current level of the second neutralization current $I_{NL2}$ may be adjusted by the mirror ratio of the second current mirror 130 with respect to the first neutralization current $I_{NL2}$, that is, the ratio $A_2$ of the current level of the second neutralization current $I_{NL2}$ to the current level of the current $I_6$.

Figure 2:
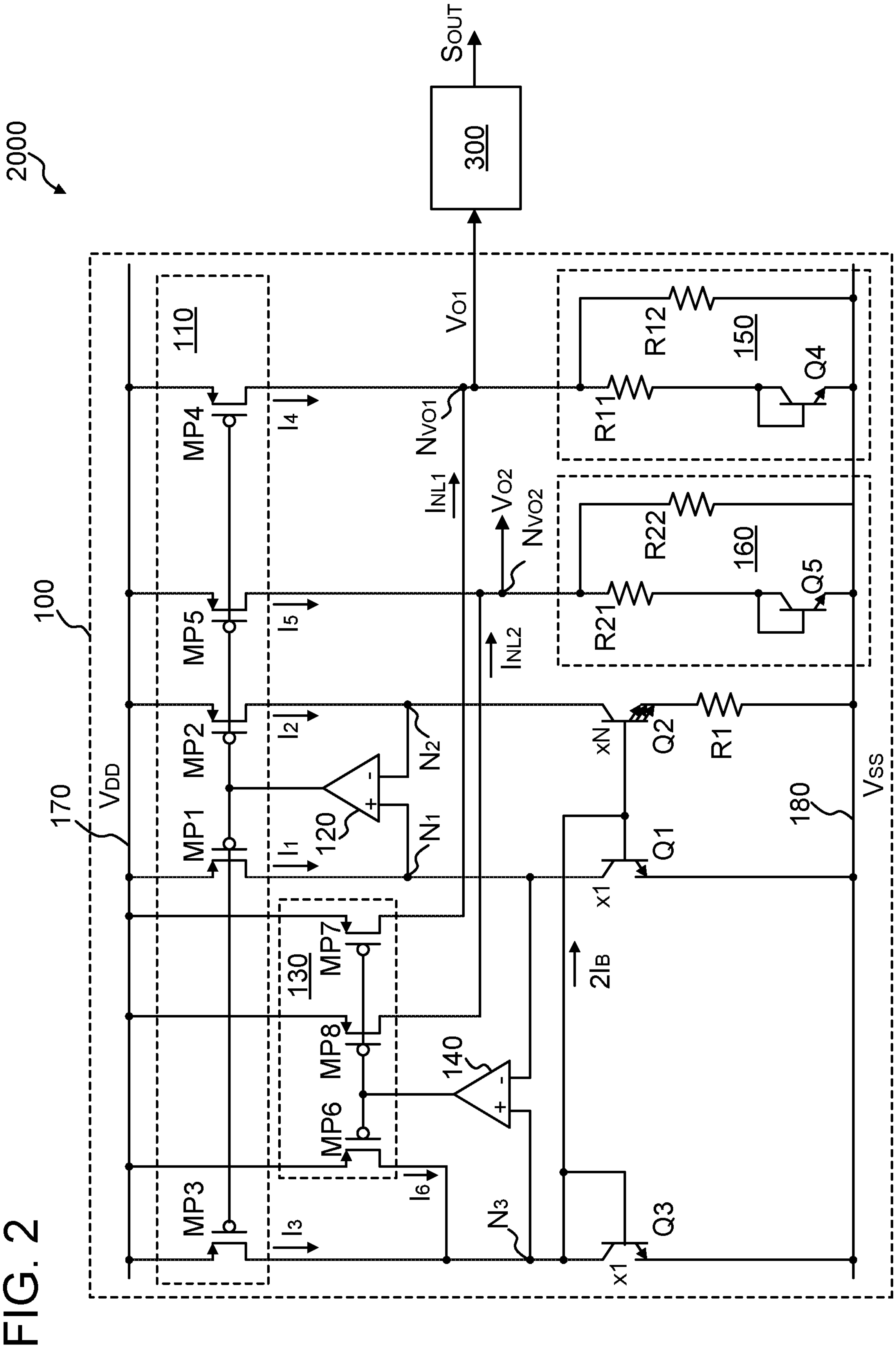
FIG. 2 shows another example configuration of an integrated circuit, according to one or more embodiments.

FIG. 2 shows an example configuration of an integrated circuit 2000, according to one or more embodiments. In the shown embodiment, the integrated circuit 2000 includes the voltage generator circuit 100 shown in FIG. 1 and further includes a subsequent stage circuit 300 coupled to the first voltage output node $V_{O1}$ and configured to generate an output signal $S_{OUT}$. In the embodiment shown in FIG. 2, one or more circuit element parameters of the first load component 150 (e.g., the resistances of the resistor elements R11 and R12 and the area of the base-emitter junction of the bipolar transistor Q4) are adjusted such that the first output voltage $V_{O1}$ has a non-zero temperature dependence that at least partially cancels the temperature dependence of the output signal $S_{OUT}$. In some implementations, one or more circuit element parameters of the first load component 150 may be adjusted such that the first output voltage $V_{O1}$ has a non-zero temperature dependence that causes one or more characteristics of the output signal $S_{OUT}$ (e.g., voltage, current, frequency, etc.) to be substantially constant with temperature.

Figure 3:
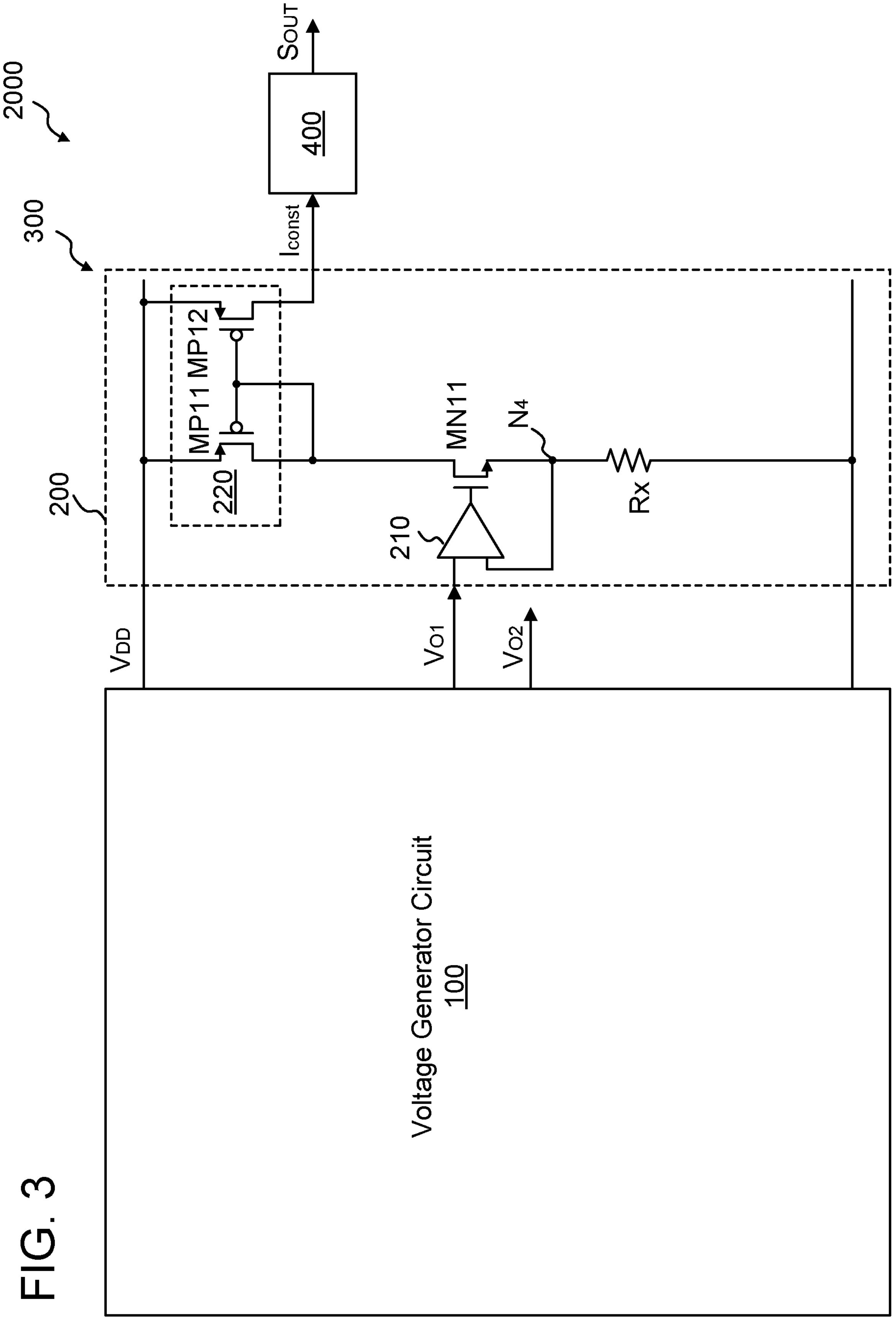
FIG. 3 shows an example configuration of a subsequent stage circuit, according to one or more embodiments.

FIG. 3 shows an example configuration of the subsequent stage circuit 300 shown in FIG. 2, according to one or more embodiments. In the shown embodiment, the subsequent stage circuit 300 includes the voltage-to-current conversion circuit 200 shown in FIG. 2 and further includes a circuit 400 configured to receive the constant output current Iconst and generate an output signal Sour using the constant output current Iconst. One or more circuit element parameters of the first load component 150 may be adjusted such that the first output voltage $V_{O1}$ has a non-zero temperature dependence that causes one or more characteristics of the output signal $S_{OUT}$ (e.g., voltage, current, frequency, etc.) to be substantially constant with temperature. In some implementations, the circuit 400 may be an oscillator circuit configured to generate an oscillating output having a frequency controlled by the constant output current Iconst. In such implementations, one or more circuit element parameters of the first load component 150 may be adjusted such that the first output voltage $V_{O1}$ has a non-zero temperature dependence that causes the frequency of the oscillating output to be substantially constant with temperature.

Figure 4:
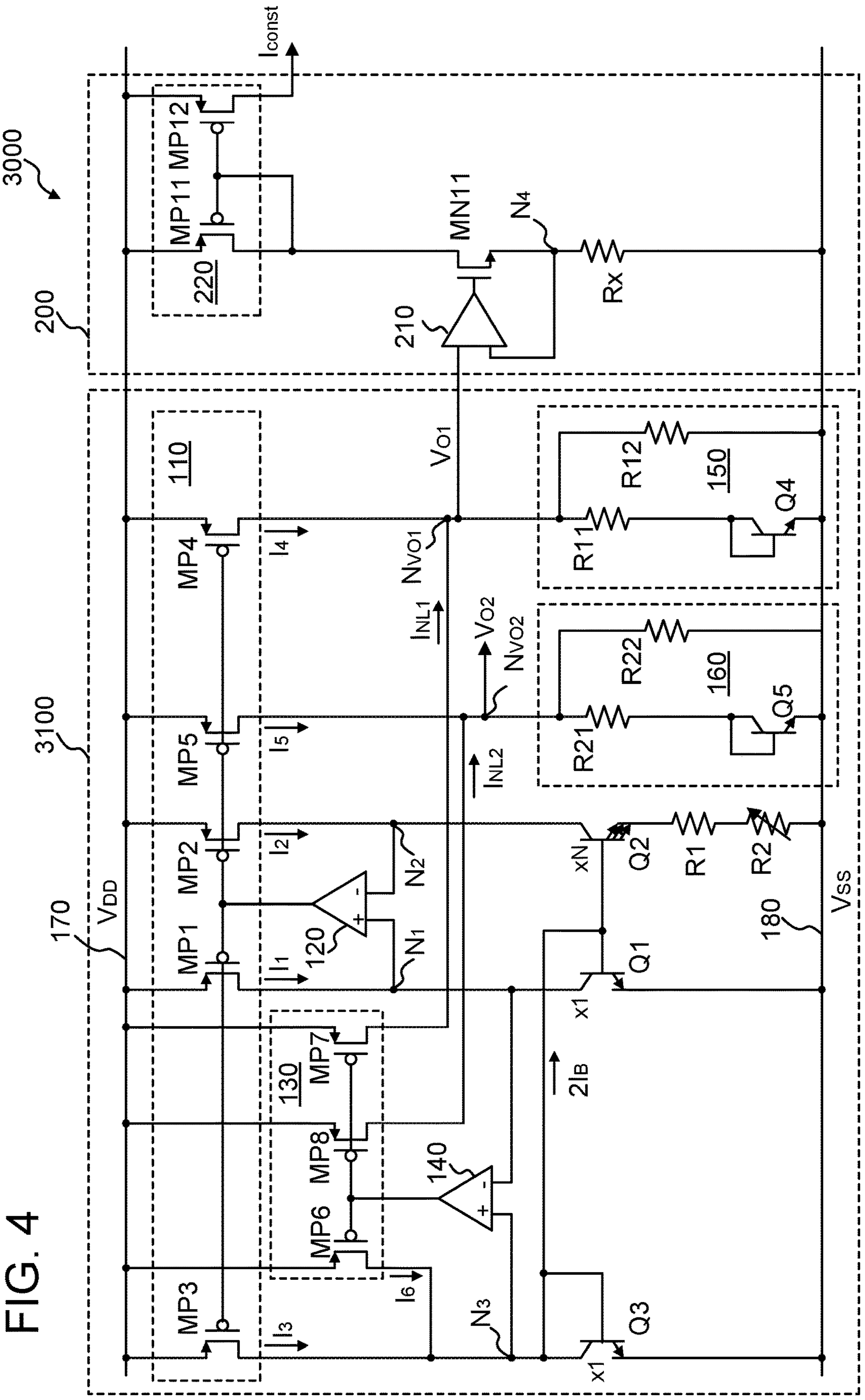
FIG. 4 shows yet another example configuration of an integrated circuit, according to one or more embodiments.

FIG. 4 shows an example configuration of an integrated circuit 3000, according to one or more embodiments. The integrated circuit 3000 includes a voltage generator circuit 3100 instead of the voltage generator circuit 100 shown in FIG. 1. The voltage generator circuit 3100 is configured similarly to the voltage generator circuit 100 shown in FIG. 1 except that the voltage generator circuit 3100 additionally includes a variable resistor element R2 coupled in series to the resistor element R1 between the emitter of the bipolar transistor Q2 and the ground line 180. It is noted that the positions of the resistor element R1 and the variable resistor element R2 are interchangeable. The variable resistor element R2 has a resistance that is dependent on the power supply voltage VDD supplied to the power supply line 170.

Figure 5:
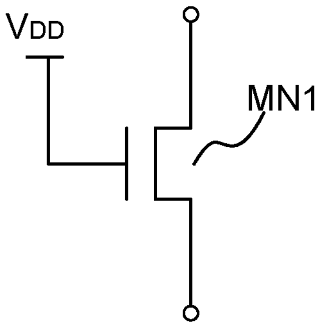
FIG. 5 shows an example configuration of a variable resistor element, according to one or more embodiments.

In one or more embodiments, as shown in FIG. 5, an NMOS transistor MN1 having a gate configured to receive the power supply voltage $V_{DD}$ may be used as the variable resistor element R2. The on-resistance of the NMOS transistor MN1 depends on the power supply voltage $V_{DD}$, and this property allows the NMOS transistor MN1 to be used as the variable resistor element R2. In this case, the resistance of the variable resistor element R2 decreases as the power supply voltage $V_{DD}$ increases. In an alternative embodiment, a bias voltage generated from the power supply voltage $V_{DD}$, for example, through voltage division of the power supply voltage $V_{DD}$. In other embodiments, a PMOS transistor may be used as the variable resistor element R4.

As a first approximation similar to that discussed in the above, the first and second output voltages $V_{O1}$ and $V_{O2}$ generated by the voltage generator circuit 3100 shown in FIG. 4 may be represented by the following expressions (15) and (16), respectively:

$$V_{O1} = \frac{R12}{R11 + R12}\left(\frac{R11 \cdot Vt \cdot \ln(N)}{R1 + R2} + V_{BE4}\right), \text{ and} \tag{15}$$

$$V_{O2} = \frac{R22}{R21 + R22}\left(\frac{R21 \cdot Vt \cdot \ln(N)}{R1 + R2} + V_{BE5}\right). \tag{16}$$

It is noted that expressions (15) and (16) can be obtained by replacing R1 in expressions (8) and (9) by R1+R2. As is understood from expressions (15) and (16), the dependence of the first and second output voltages $V_{O1}$ and $V_{O2}$ on the power supply voltage $V_{DD}$ can be reduced by appropriately selecting the property of the variable resistor element R2 in accordance with the dependencies of the output voltages $V_{O1}$ and $V_{O2}$ on the power supply voltage $V_{DD}$ for the case where the variable resistor element R2 is not used. In implementations where the first and second output voltages $V_{O1}$ and $V_{O2}$ potentially increase as the power supply voltage $V_{DD}$ increases, the dependence of the first and second output voltages $V_{O1}$ and $V_{O2}$ on the power supply voltage $V_{DD}$ can be reduced by using a variable resistor element R2 configured to have a resistance that increases as the power supply voltage $V_{DD}$ increases. In other embodiments where the first and second output voltages $V_{O1}$ and $V_{O2}$ potentially decrease as the power supply voltage $V_{DD}$ increases, in contrast, the dependence of the first and second output voltages $V_{O1}$ and $V_{O2}$ on the power supply voltage $V_{DD}$ can be reduced by using a variable resistor element R2 configured to have a resistance that decreases as the power supply voltage $V_{DD}$ increases.

Figure 6:
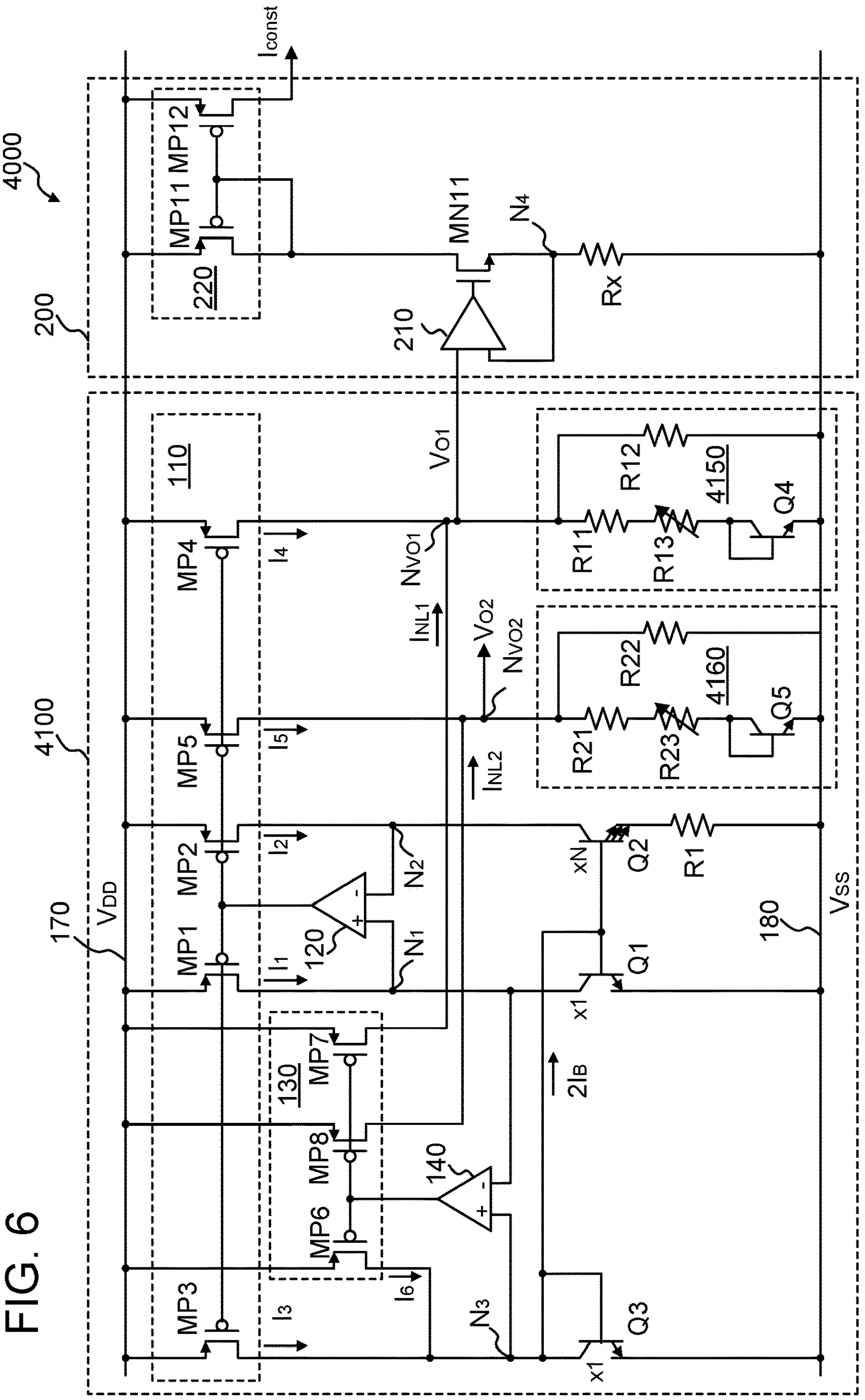
FIG. 6 shows yet another example configuration of an integrated circuit, according to one or more embodiments.

FIG. 6 shows an example configuration of an integrated circuit 4000, according to one or more embodiments. The integrated circuit 4000 includes a voltage generator circuit 4100 instead of the voltage generator circuit 100 shown in FIG. 1. The voltage generator circuit 4100 is configured similarly to the voltage generator circuit 100 shown in FIG. 1, except that the voltage generator circuit 4100 includes a first load component 4150 instead of the first load component 150 shown in FIG. 1 and a second load component 4160 instead of the second load component 160 shown in FIG. 1.

The first load component 4150 is configured similarly to the first load component 150 shown in FIG. 1, except that the first load component 4150 additionally includes a variable resistor element R13 coupled in series to the resistor element R11 and the diode-coupled bipolar transistor Q4. The variable resistor element R13 has a resistance that is dependent on the power supply voltage VDD supplied to the power supply line 170. In one implementation, an NMOS transistor configured to receive the power supply voltage VDD at the gate may be used as the variable resistor element R13, as discussed in relation to FIG. 5. It should be noted that the positions of the resistor element R11, the variable resistor element R13 and the diode-coupled bipolar transistor Q4 are interchangeable.

The second load component 4160 is configured similarly to the second load component 160 shown in FIG. 1, except that the second load component 4160 additionally includes a variable resistor element R23 coupled in series to the resistor element R21 and the diode-coupled bipolar transistor Q5. The variable resistor element R23 has a resistance that is dependent on the power supply voltage VDD supplied to the power supply line 170. In one implementation, an NMOS transistor configured to receive the power supply voltage VDD at the gate may be used as the variable resistor element R23, as discussed in relation to FIG. 5. It should be noted that the positions of the resistor element R21, the variable resistor element R23 and the diode-coupled bipolar transistor Q5 are interchangeable.

As a first approximation, the first and second output voltages $V_{O1}$ and $V_{O2}$ generated by the voltage generator circuit 4100 shown in FIG. 6 may be represented by the following expressions (17) and (18), respectively:

$$V_{O1} = \frac{R12}{R11 + R12 + R13}\left(\frac{(R11 + R13) \cdot Vt \cdot \ln(N)}{R1} + V_{BE4}\right), \text{ and} \tag{17}$$

$$V_{O2} = \frac{R22}{R21 + R22 + R23}\left(\frac{(R21 + R23) \cdot Vt \cdot \ln(N)}{R1} + V_{BE5}\right). \tag{18}$$

It is noted that expression (17) can be obtained by replacing R11 in expression (8) by R11+R13 and expression (18) can be obtained by replacing R21 in expression (8) by R21+R23. As is understood from expressions (17) and (18), the dependence of the first and second output voltages $V_{O1}$ and $V_{O2}$ on the power supply voltage $V_{DD}$ can be reduced by appropriately selecting the properties of the variable resistor elements R13 and R23 in accordance with the dependencies of the output voltages $V_{O1}$ and $V_{O2}$ on the power supply voltage $V_{DD}$ for the case where the variable resistor elements R13 and R23 are not used.

Figure 7:
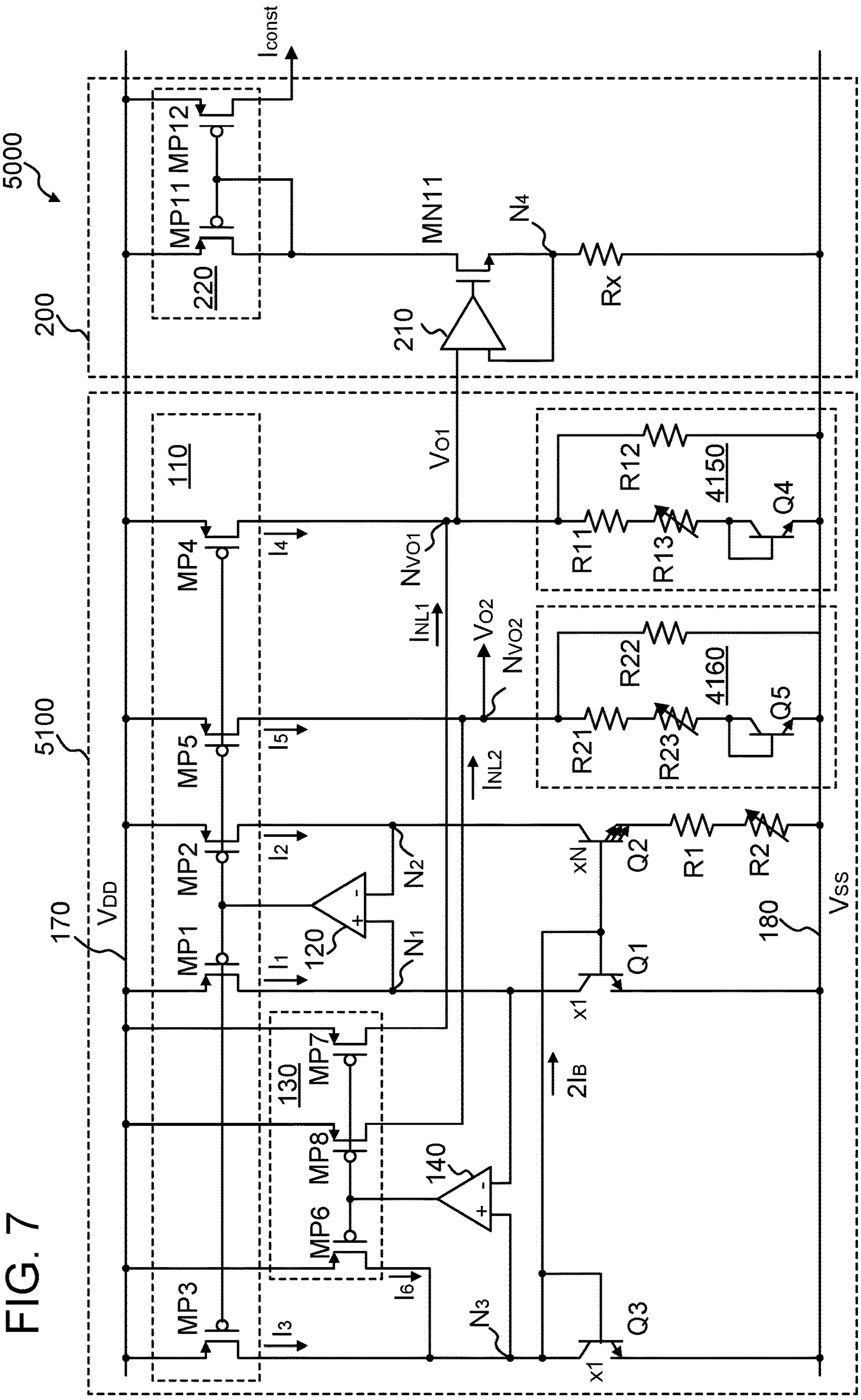
FIG. 7 shows yet another example configuration of an integrated circuit, according to one or more embodiments.

FIG. 7 shows an example configuration of an integrated circuit 5000, according to one or more embodiments. The integrated circuit 5000 includes a voltage generator circuit 5100 instead of the voltage generator circuit 4100 shown in FIG. 6. The voltage generator circuit 5100 is configured similarly to the voltage generator circuit 4100 shown in FIG. 6, except that the voltage generator circuit 5100 additionally includes a variable resistor element R2 coupled in series to the resistor element R1 between the emitter of the bipolar transistor Q2 and the ground line 180. As discussed in relation to FIG. 5, an NMOS transistor configured to receive the power supply voltage VDD at the gate may be used as the variable resistor element R2. It should be noted that the positions of the resistor element R1 and the variable resistor element R2 are interchangeable.

As a first approximation, the first and second output voltages $V_{O1}$ and $V_{O2}$ generated by the voltage generator circuit 5100 shown in FIG. 7 may be represented by the following expressions (19) and (20), respectively:

$$V_{O1} = \frac{R12}{R11+R12+R13}\left(\frac{(R11+R13)\cdot Vt\cdot\ln(N)}{R1+R2}+V_{BE4}\right),\text{ and} \tag{19}$$

$$V_{O2} = \frac{R22}{R21+R22+R23}\left(\frac{(R21+R23)\cdot Vt\cdot\ln(N)}{R1+R2}+V_{BE5}\right). \tag{20}$$

It is noted that expression (19) can be obtained by replacing R1 in expression (17) by R1+R2 and expression (20) can be obtained by replacing R1 in expression (18) by R1+R2. As is understood from expressions (19) and (20), the dependence of the first and second output voltages $V_{O1}$ and $V_{O2}$ on the power supply voltage $V_{DD}$ can be reduced by appropriately selecting the properties of the variable resistor elements R2, R13, and R23 in accordance with the dependencies of the output voltages $V_{O1}$ and $V_{O2}$ on the power supply voltage $V_{DD}$ for the case where the variable resistor elements R1, R13 and R23 are not used.

Figure 8:
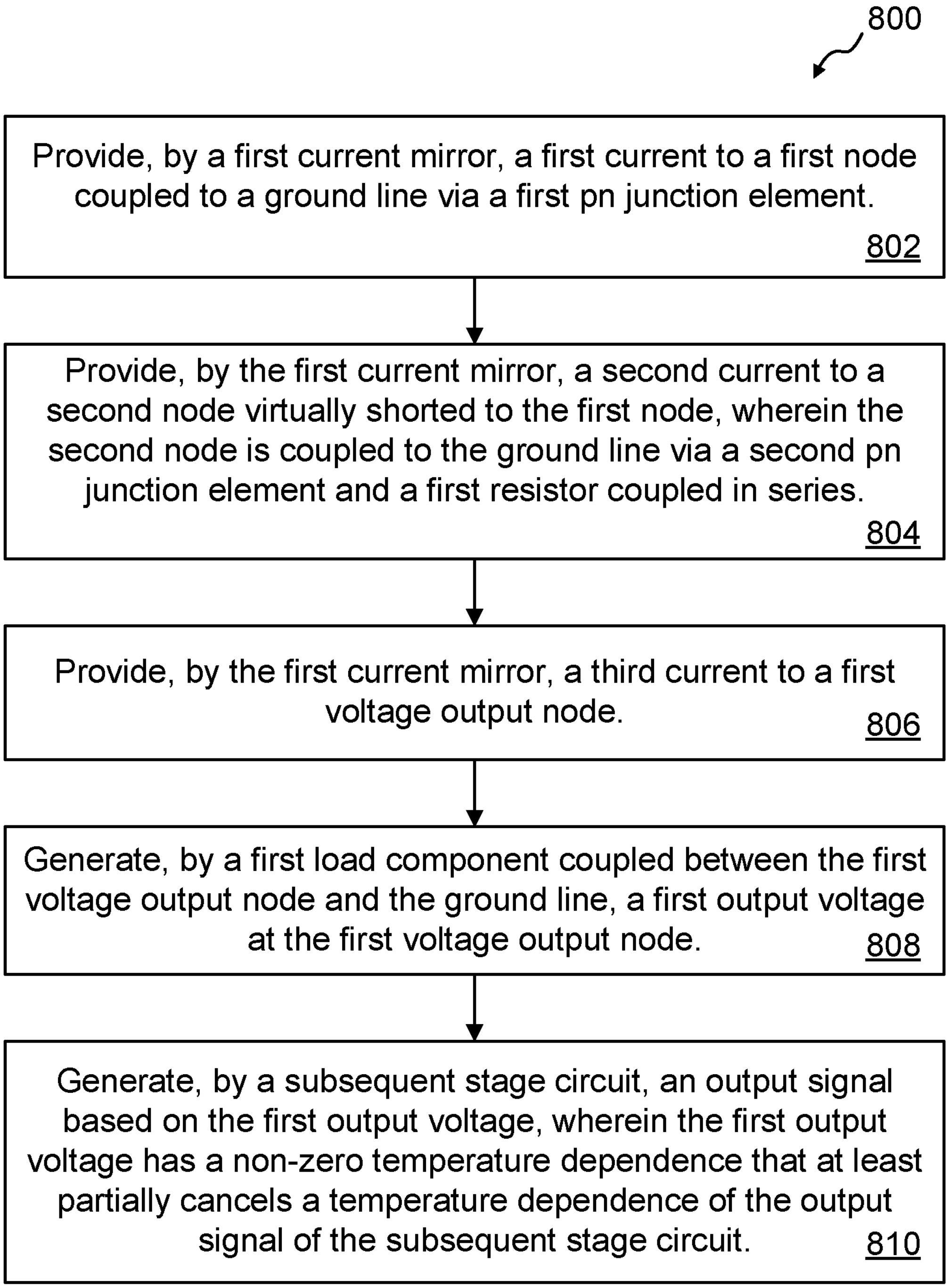
FIG. 8 is a flowchart of an exemplary process for operating an integrated circuit, according to one or more embodiments.

FIG. 8 is a flowchart of an exemplary process 800 for operating an integrated circuit, according to one or more embodiments. The process 800 may be performed by any of the integrated circuits 1000, 2000, 3000, 4000, and 5000 shown in FIGS. 1 through 7. However, it will be recognized that an input device that includes additional and/or fewer components as shown in FIGS. 1 through 7 may be used to perform the process 800, that any of the following steps may be performed in any suitable order, and that the process 800 may be performed in any suitable environment.

The process 800 includes providing, by a first current mirror (e.g., the first current mirror 110 shown in FIGS. 1, 2, 4, 6, and 7), a first current (e.g., the first current $I_1$) to a first node (e.g., the node $N_1$) coupled to a ground line (e.g., the ground line 180) via a first pn junction element (e.g., the bipolar transistor Q1) at step 802. The process 800 further includes, providing, by the first current mirror, a second current (e.g., the second current $I_2$) to a second node (e.g., the node $N_2$) virtually shorted to the first node at step 804. The second node is coupled to the ground line via a second pn junction element (e.g., the bipolar transistor Q2) and a first resistor element (e.g., the resistor element R1) coupled in series. The process 800 further includes providing, by the first current mirror, a third current (e.g., the fourth current $I_4$) to a first voltage output node (e.g., the first voltage output node $N_{VO1}$) at step 806. The process 800 further includes generating, by a first load component (e.g., the first load components 150 and 4150) coupled between the first voltage output node and the ground line, a first output voltage (e.g., the first output voltage $V_{O1}$) at the first voltage output node at step 808. The process 800 further includes generating, by a subsequent stage circuit (e.g., the voltage-to-current conversion circuit 200 shown in FIG. 1 and the subsequent stage circuits shown in FIGS. 2 and 3), an output signal (e.g., the constant output current Iconst shown in FIG. 1 and the output signal $S_{OUT}$ shown in FIGS. 2 and 3) based on the first output voltage at step 810. The first output voltage has a non-zero temperature dependence that at least partially cancels a temperature dependence of the output signal of the subsequent stage circuit.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An integrated circuit, comprising:

a first current mirror configured to:

provide a first current to a first node;

provide a second current to a second node virtually shorted to the first node; and provide a third current to a first voltage output node;

a first pn junction element between the first node and a ground line, wherein the first pn junction element comprises a first bipolar transistor comprising a collector configured to receive the first current and an emitter coupled to the ground line;

a first resistor element between the second node and the ground line;

a second pn junction element coupled in series to the first resistor element, wherein the second pn junction element comprises a second bipolar transistor comprising a collector configured to receive the second current and an emitter coupled to the ground line via the first resistor element, wherein bases of the first and second bipolar transistors are commonly coupled to each other;

a third bipolar transistor comprising a collector coupled to a third node virtually shorted to the first node, wherein the first current mirror is further configured to provide a fifth current to the third node; an emitter coupled to the ground line; and a base coupled to the third node and the commonly coupled bases of the first and second bipolar transistors;

a second current mirror configured to provide a sixth current to the third node, and provide a first neutralization current to the first voltage output node;

a first load component between the first voltage output node and the ground line, wherein the first load component is configured to generate a first output voltage at the first voltage output node;

a second load component between a second voltage output node and the ground line, wherein the first current mirror is further configured to provide a fourth current to the second voltage output node, wherein the second current mirror is further configured to provide a second neutralization current to the second voltage output node, and wherein the second load component is configured to generate a second output voltage at the second voltage output node from the fourth current and the second neutralization current such that the second output voltage is substantially constant with temperature; and a subsequent stage circuit configured to generate an output signal based on the first output voltage, wherein the first load component is configured to cause the first output voltage to increase with an increasing temperature that at least partially cancels a temperature dependence of the output signal of the subsequent stage circuit.

2. The integrated circuit of claim 1, wherein an increase of the first output voltage causes the output signal of the subsequent stage circuit to be substantially constant with temperature.

3. The integrated circuit of claim 1, wherein the subsequent stage circuit comprises a voltage-to-current converter configured to generate an output current as the output signal of the subsequent stage circuit, and wherein an increase of the first output voltage causes the output current to be substantially constant with temperature.

4. The integrated circuit of claim 3, wherein the voltage-to-current converter comprises a voltage-to-current conversion resistor used to generate the output current, and wherein the increase of the first output voltage at least partially cancels a temperature-dependent variation in the output current caused by a temperature-dependent resistance of the voltage-to-current conversion resistor.

5. The integrated circuit of claim 1, wherein the first current, the second current, and the third current are each a proportional to absolute temperature (PTAT) current.

6. The integrated circuit of claim 1, wherein the first load component comprises:

a second resistor element between the first voltage output node and the ground line;

a third pn junction element between the first voltage output node and the ground line; and a third resistor element coupled in series to the third pn junction element.

7. The integrated circuit of claim 6, wherein a resistance of the third resistor element is adjusted based on a temperature dependence of the output signal of the subsequent stage circuit.

8. The integrated circuit of claim 7, wherein the first current mirror is coupled to a power supply line, and wherein the third resistor element comprises a variable resistor element that has a resistance dependent on a power supply voltage supplied to the power supply line.

9. The integrated circuit of claim 1, wherein base currents provided to the first, second, and third bipolar transistors are generated from the sixth current.

10. The integrated circuit of claim 1, wherein a current level of the first neutralization current is adjusted based on the temperature dependence of the output signal of the subsequent stage circuit.

11. The integrated circuit of claim 1, wherein the first current mirror is coupled to a power supply line, and wherein the first resistor element comprises a variable resistor element that has a resistance dependent on a power supply voltage supplied to the power supply line.

12. A method comprising:

providing a temperature compensation circuit, wherein the temperature compensation circuit comprises:

a first current mirror;

a first pn junction element between a first node and a ground line, wherein the first pn junction element comprises a first bipolar transistor comprising a collector and an emitter coupled to the ground line;

a first resistor element between a second node and the ground line;

a second pn junction element coupled in series to the first resistor element, wherein the second pn junction element comprises a second bipolar transistor comprising a collector and an emitter coupled to the ground line via the first resistor element, and wherein bases of the first and second bipolar transistors are commonly coupled to each other;

a third bipolar transistor comprising a collector coupled to a third node virtually shorted to the first node; an emitter coupled to the ground line; and a base coupled to the third node and the commonly coupled bases of the first and second bipolar transistors;

a second current mirror;

a first load component between a first voltage output node and the ground line;

a second load component between a second voltage output node and the ground line; and a subsequent stage circuit;

providing, by the first current mirror, a first current to the first node;

providing, by the first current mirror, a second current to the second node virtually shorted to the first node;

providing, by the first current mirror, a third current to the first voltage output node;

providing, by the first current mirror, a fourth current to the second voltage output node;

providing, by the first current mirror, a fifth current to the third node;

generating, by the first load component, a first output voltage at the first voltage output node;

providing, by the second current mirror, a sixth current to the third node and a first neutralization current to the first voltage output node;

generating, by the second load component, a second output voltage at the second voltage output node from the fourth current and a second neutralization current such that the second output voltage is substantially constant with temperature; and generating, by a subsequent stage circuit, an output signal based on the first output voltage, wherein the first output voltage increases with an increasing temperature that at least partially cancels a temperature dependence of the output signal of the subsequent stage circuit.

13. The method of claim 12, wherein an increase of the first output voltage causes the output signal of the subsequent stage circuit to be substantially constant with temperature.

14. The method of claim 12, wherein the output signal is an output current generated by a voltage-to-current converter, and wherein an increase of the first output voltage causes the output current to be substantially constant with temperature.

15. The method of claim 12, wherein the first current, the second current, and the third current are each a proportional to absolute temperature (PTAT) current.

16. The method of claim 12, wherein the first load component comprises:

a second resistor element between the first voltage output node and the ground line;

a third pn junction element between the first voltage output node and the ground line; and a third resistor element coupled in series to the third pn junction element.

17. The method of claim 16, further comprising:

adjusting a resistance of the third resistor element based on a temperature dependence of the output signal of the subsequent stage circuit.

18. The method of claim 17, wherein the first current mirror is coupled to a power supply line, and wherein the third resistor element comprises a variable resistor element that has a resistance dependent on a power supply voltage supplied to the power supply line.

* * * * *